Jan. 5, 1965     N. T. GENERAL     3,164,232
SEQUENTIALLY OPERABLE CLUTCH ASSEMBLY AND FLUID COUPLING
Filed Dec. 31, 1962                             2 Sheets-Sheet 1
Fig.1
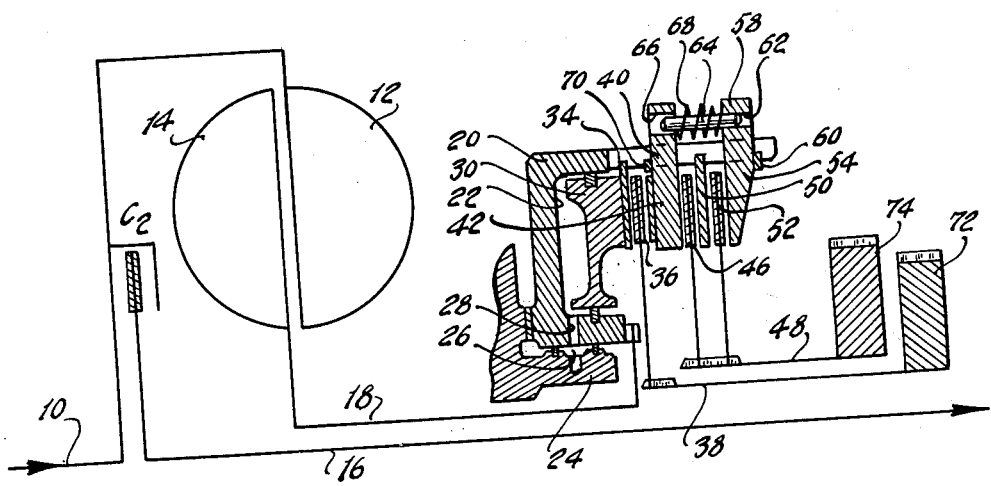
Fig.2                             Fig.3
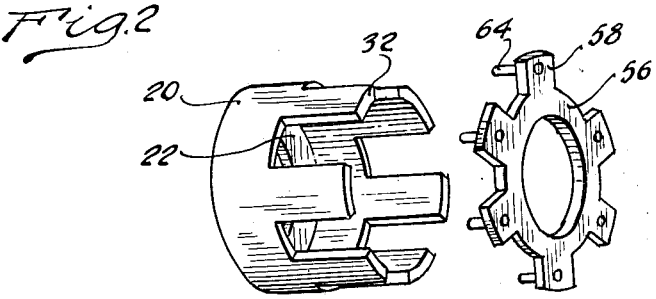
INVENTOR:
NORMAN T. GENERAL
BY
ATTORNEYS.

| RANGE | C4 | C3 | C2 | C1 | RATIO |
|---|---|---|---|---|---|
| LOW | ON | OFF | OFF | DRIVE | 3.234 |
| INT. (H.B.) | ON | ON | OFF | O'RUN | 1.726 |
| DIRECT | ON | OFF | ON | O'RUN | 1.000 |
| REVERSE | ON | OFF | OFF | DRIVE | 3.921 |
| NEUTRAL | OFF | OFF | OFF | — | — |

INVENTOR:
NORMAN T. GENERAL
BY
ATTORNEYS.

United States Patent Office 3,164,232
Patented Jan. 5, 1965

3,164,232
SEQUENTIALLY OPERABLE CLUTCH ASSEMBLY AND FLUID COUPLING
Norman T. General, Orchard Lake, Mich., assignor to Ford Motor Company, Dearborn, Mich., a corporation of Delaware
Filed Dec. 31, 1962, Ser. No. 248,338
2 Claims. (Cl. 192—3.2)

My invention relates generally to improvements in clutch assemblies, and more particularly to a clutch assembly having multiple stages that may be applied and released sequentially to establish and interrupt separate torque delivery paths between a driving member and each of two driven elements.

I contemplate that my improved clutch assembly may be used in a geared power transmission mechanism for the purpose of establishing a driving connection between a driving shaft and each of two power input gear elements of a gear unit, the power output element of which may be connected drivably to a driven member.

A preferred embodiment of my invention comprises a pair of friction disc assemblies situated in the path of motion of a fluid pressure operated piston. Each disc assembly is provided with a pressure reaction disc that is carried by a clutch cylinder member within which the piston is situated. One reaction disc is shiftable as the pressure force of the piston is applied to a first of the pair of disc assemblies. This reaction disc is caused to yield, however, after a predetermined pressure is applied by the piston. This pressure is sufficient to establish clutching engagement of one disc assembly. As the pressure force of the piston is increased, the yielding of the first reaction disc for the first disc assembly will permit a force to be applied directly through the first reaction disc to the clutch discs of the second disc assembly. After the piston force is increased above a desired value, both clutch assemblies will be engaged.

It is an object of my invention to provide a simplified multiple disc clutch assembly capable of establishing sequentially either of two torque delivery paths from a driving member to two driven elements wherein sequential operation of the clutch assembly can be established by appropriately controlling the force applied to the piston.

It is another object of my invention to provide a multiple disc clutch assembly having common clutch elements and a single pressure operated servo capable of actuating each of two clutch portions of the assembly.

It is a further object of my invention to provide a multiple disc clutch assembly of the type above set forth wherein one clutch portion or both clutch portions can be actuated as desired depending upon the degree to which the clutch servo is energized.

For the purpose of describing more particularly the improvements of my invention, reference will be made to the accompanying drawings, wherein:

FIGURE 1 shows in cross-sectional form my improved multiple disc clutch assembly;

FIGURE 2 is a detailed isometric view of the clutch servo cylinder for the assembly of FIGURE 1;

FIGURE 3 is a detailed isometric view of the shiftable reaction disc referred to in the foregoing paragraphs;

Figures 4, 5:
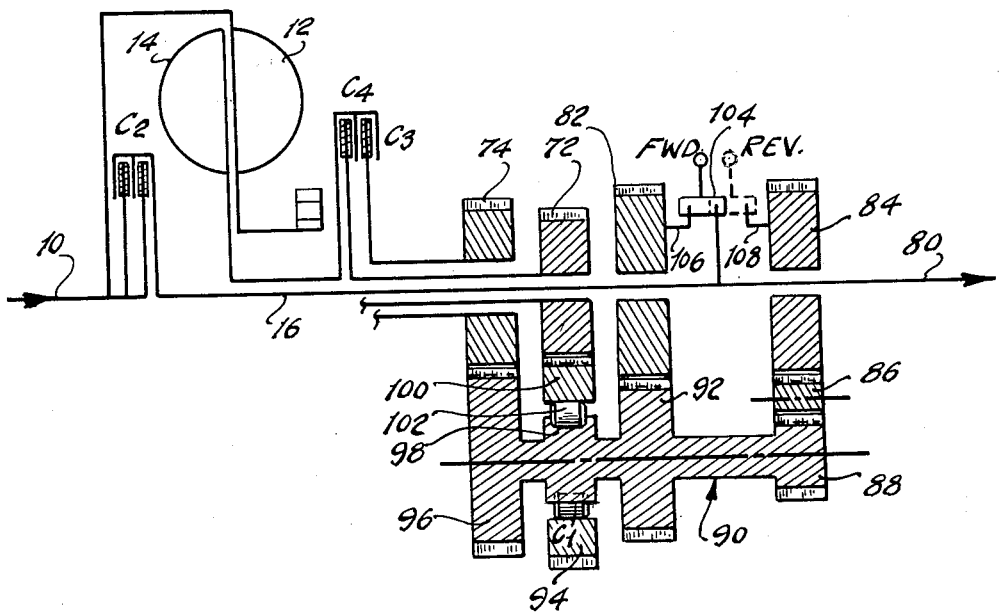
FIGURE 4 is a schematic representation of a countershaft gear mechanism capable of accommodating the clutch construction of FIGURES 1, 2 and 3; and, FIGURE 5 is a chart showing the clutch engagement and release pattern that is necessary to establish the various speed ratio changes for the transmission mechanism of FIGURE 4.

Referring first to FIGURE 1, numeral 10 designates a driving member which can be in the form of a crankshaft for an internal combustion engine of an automotive vehicle. A fluid coupling may be provided, and it includes a bladed impeller member 12 and a bladed turbine member 14 situated in toroidal fluid flow relationship in the usual fashion.

Driving member 10 can be connected to an intermediate shaft 16 by means of a clutch assembly designated by the symbol C2. This clutch assembly can be applied and released during a shift sequence in a fashion subsequently to be explained.

Turbine member 14 is connected drivably to a sleeve shaft 18 that in turn is connected drivably to a clutch cylinder 20. This cylinder defines an annular pressure chamber 22 and is mounted for rotation about a stationary sleeve 24 that may form a part of the transmission housing. A suitable bushing 26 can be provided for this purpose.

Fluid pressure can be admitted into the chamber 22 through a suitable pressure passage 28 which in turn can communicate with a fluid pressure distributor manifold of conventional arrangement.

Situated within the chamber 22 is an annular piston 30 which cooperates with the cylinder member 20 to define the previously mentioned pressure chamber 22.

The cylinder member 20 includes axial extensions at its outer periphery, as best seen in FIGURE 2. These extensions are designated by reference character 32. They are separated by slots as indicated.

A pair of externally splined clutch dics 34 are carried by the extensions 32. Each disc 34 is formed with keys at its outer periphery that engage the slots between extensions 32. It is situated adjacent a friction surface formed on piston 30.

A friction disc 36 is situated adjacent discs 34 and is positively connected to a sleeve shaft 38. Adjacent disc 36 is a separator disc 38 carried by a reaction disc 40. It includes a body portion 42 and radially extending projections 44. These projections are adapted to be received in the slots between the extensions 32 of the clutch element 20.

Situated on the left hand side of the reaction disc 40 is another disc 46 which is positively connected to a sleeve shaft 48 concentrically mounted for rotation about the sleeve shaft 38 and shaft 16. Another separator disc, shown at 50, is carried by the extensions 32. The outer periphery of disc 50 has projections that are received within the slots defined by extensions 32.

Another clutch disc 52 is situated between separator disc 50 and a second reaction disc 54. Disc 52, like disc 46, is connected positively to sleeve shaft 48 by an appropriate spline connection.

Reaction disc 54 is best seen in FIGURE 3. It includes a splined portion 56 and radially extending projections 58, the latter being received within the slots defined by extensions 32 of the clutch cylinder member 20. A snap ring 60 resists axial movement of the reaction disc 54.

The projections 58 are apertured as shown at 62. Received within these apertures with a force fit are pins 64. The extremities of pins 64 are received within openings 66 formed in the projections 44 of the reaction disc 40. These pins 64 serve as guides for separator springs 68 that normally urge the reaction discs apart.

Movement of reaction disc 40 in a right hand direction as viewed in FIGURE 1 is limited by a snap ring 70 carried by the inner periphery of extensions 32.

Sleeve shaft 38 is connected to a first gear element 72 and sleeve shaft 48 is connected to a second gear element 74. These gear elements form a part of a geared transmission assembly, which will be described with reference to FIGURE 4.

Piston 30 normally is urged in a right hand direction, as viewed in FIGURE 1, by a piston return spring 76 which is anchored by a spring retainer 78 carried by the hub of clutch cylinder member 20.

It will be apparent from the description of FIGURE 1 that if fluid pressure is admitted to the chamber 22, a pressure force will be exerted upon piston 30. This force is transmitted to the clutch disc 36 causing a frictional driving connection between clutch cylinder member 20 and sleeve shaft 38. If the magnitude of the pressure supplied to chamber 22 is sufficient to overcome the opposing force of spring 68, the discs 46 and 52 will be capable of rotating freely with respect to reaction discs 42 and 54. If the pressure in cylinder 22 is increased beyond the desired limit, however, spring 16 will yield thus permitting a fluid pressure force to be applied to discs 46 and 52. Under these conditions, reaction disc 42 serves as a reaction means for disc 36 and it also serves as a pressure plate for discs 46 and 52. Under these circumstances, both clutches are applied and turbine torque from turbine 14 is distributed to each gear element 72 and 74. Gear element 74 becomes drivably engaged with clutch cylinder member 20 as the second disc assembly, shown in part at 52 and 46, becomes applied.

Referring next to FIGURE 4, I have illustrated a countershaft gear mechanism that is capable of accommodating the clutch construction of FIGURE 1. It includes the previously described fluid coupling having impeller member 12 and turbine member 14. For convenience, the disc assembly that establishes a driving connection between turbine member 14 and gear element 72 is identified in FIGURE 4 as clutch C4. Similarly, the disc assembly that establishes the driving connection between turbine member 14 and gear element 74 is identified by the symbol C3.

The intermediate shaft 16 is connected directly to a power output shaft 80 which in turn can be connected to the vehicle traction wheels. The gear elements 72 and 74 are rotatably journalled for rotation about the axis of shaft 16. Another gear element 82 and a reverse gear element 84 also are journalled about shaft 16, the latter element engaging a reverse idler pinion 86 situated for rotation upon an axis parallel to shaft 16. Pinion 86 in turn engages a reverse gear element 88 of a cluster gear assembly 90. This assembly 90 is journalled for rotation about a third axis that is parallel to shaft 16.

Cluster gear assembly 90 includes gear elements 92, 94 and 96 which respectively engage gear elements 82, 72 and 74.

Gear element 94 includes an overrunning coupling that comprises an inner race 98 and an outer race 100. Situated between races 98 and 100 is a series of rollers 102 that may cooperate with cam surfaces formed on the outer race 100. The outer race 100 is defined by the hub of gear 94.

Rollers 102 thus are capable of accommodating freewheeling motion of gear element 94 with respect to the remaining portions of the cluster gear assembly 90. Relative freewheeling motion in the opposite direction is inhibited.

A forward and reverse clutch sleeve 104 is carried by shaft 16 and is capable of being shifted axially in either direction. If it is shifted in the left-hand direction as viewed in FIGURE 1, it establishes a positive connection between shaft 16 and gear 82. A clutch element 106 is carried by gear element 82 for this purpose. On the other hand, if sleeve 104 is shifted in a right-hand direction, as viewed in FIGURE 1, it engages a clutch element 108 carried by reverse gear element 84. Thus reverse gear element becomes connected to shaft 16.

During forward drive operation, the sleeve 104 is positioned as shown in FIGURE 1 by means of full lines.

To establish the lowest speed ratio for the mechanism of FIGURE 4, clutch C4 is applied by supplying a reduced pressure to clutch chamber 22. The torque applied to the turbine member then is distributed through clutch C4 to gear element 72. This torque is multiplied by gear elements 92 and 82. It then is distributed to power output shaft 80 through shaft 16.

To establish intermediate speed ratio operation, it merely is necessary to supply an increased pressure to chamber 22. Thus both clutches C4 and C3 become applied. Turbine torque then is distributed directly to gear element 74 and is multiplied by gear elements 74 and 96, and also by gear elements 92 and 82 before it is distributed to power output shaft 80. Under these conditions, the overrunning coupling shown in part at 102 is caused to freewheel. The shift from the low speed ratio to the intermediate speed ratio thus can be described as a so-called pick-up shift.

High-speed direct drive operation can be obtained by releasing pressure from the chamber 22 and sequentially applying clutch C2 by an appropriate servo structure, not shown. Thus a direct drive connection is established between power input shaft 10 and power output shaft 80.

Reverse drive operation is obtained by shifting the sleeve 104 in a right-hand direction to lock gear element 84 to the shaft 16. A reduced pressure then can be distributed to chamber 22 to cause engagement of clutch C4. Under these conditions, turbine torque is distributed from turbine member 14 through clutch C4 to gear element 72. It then is multiplied by gear elements 72 and 94 and by the reverse gear elements 88 and 84. Pinions 86 function to reverse the direction of motion.

Having thus described preferred embodiments of my invention, what I claim and desire to secure by United States Letters Patent is:

1. In a torque transmitting mechanism capable of establishing dual torque delivery paths from a driving member to each of two driven members, an annular clutch servo cylinder, first and second reaction discs carried by said cylinder, means for normally biasing said reaction discs apart, one reaction disc being shiftable relative to the other against the influence of the biasing means, separate clutch disc assemblies situated adjacent each of said reaction discs, one clutch disc assembly being connected to one driven member and the other clutch disc assembly being connected to the other driven member, the pressure force applied to said piston being distributed to each disc assembly to establish sequentially a driving connection between said cylinder and each driven member, the outer periphery of said cylinder having an axial extension, axial slots formed in said extension, an annular piston disposed in said cylinder, said reaction discs having radial projections extending through said slots, said clutch disc assemblies being disposed on each side of one reaction disc, said one reaction disc being shiftably axially by said piston as pressure is supplied to said cylinder thereby causing sequential engagement of said friction discs and said reaction discs, said biasing means comprising compression springs engageable with the radially outwardly extending portion of said one reaction disc at locations spaced radially outwardly from said cylinder whereby the operating radius of said clutch disc assemblies is a maximum.

2. In a torque transmitting mechanism capable of establishing dual torque delivery paths from a driving member to each of two driven members, an annular clutch servo cylinder, first and second reaction discs carried by said cylinder, means for normally biasing said reaction discs apart, one reaction disc being shiftable relative to the other against the influence of the biasing means, separate clutch disc assemblies situated adjacent each of said reaction discs, one clutch disc assembly being connected to one driven member and the other clutch disc assembly being connected to the other driven member, the pressure force applied to said piston being distributed to each disc assembly to establish sequentially a driving connection between said cylinder and each driven member, the outer periphery of said cylinder having an axial extension, axial slots formed in said extension, an annular piston disposed in said cylinder, said reaction discs having radial projections extending through said slots, said clutch disc assemblies being disposed on each side of one reaction disc, said one reaction disc being shiftable axially by said piston as pressure is supplied to said cylinder thereby causing sequential engagement of said friction discs and said reaction discs, said biasing means comprising compression springs engageable with the radially outwardly extending portion of said one reaction disc at locations spaced radially outwardly from said cylinder whereby the operating radius of said clutch disc assemblies is a maximum, a hydrokinetic fluid coupling means forming in part a driving connection between said driving member and said cylinder and a selectively engageable friction clutch means for connecting directly said driving member to said driven member to establish a direct driving relationship therebetween when each of said clutch disc assemblies is disengaged.

References Cited by the Examiner
UNITED STATES PATENTS

| 2,488,756 | 11/49 | Baker | 192—87 |
| 2,620,679 | 12/52 | Issigonis et al. | 74—330 |
| 2,804,780 | 9/57 | Gerst. | |

FOREIGN PATENTS

| 794,612 | 5/58 | Great Britain. |

DAVID J. WILLIAMOWSKY, *Primary Examiner.*